US010540908B2

(12) United States Patent
Blackburn et al.

(10) Patent No.: US 10,540,908 B2
(45) Date of Patent: Jan. 21, 2020

(54) FIRE FIGHTING TRAINING SYSTEM WITH STEAM/SMOKE GENERATION

(71) Applicant: LION GROUP, INC., Dayton, OH (US)

(72) Inventors: John Joseph Blackburn, Rensselaer, NY (US); Daniel A. Goldman, Albany, NY (US); Evan Andrew Ladd, Amsterdam, NY (US)

(73) Assignee: LION GROUP, INC., Dayton, OH (US)

( * ) Notice: Subject to any disclaimer, the term of this patent is extended or adjusted under 35 U.S.C. 154(b) by 197 days.

(21) Appl. No.: 14/487,845

(22) Filed: Sep. 16, 2014

(65) Prior Publication Data

US 2015/0079559 A1    Mar. 19, 2015

Related U.S. Application Data

(60) Provisional application No. 61/878,355, filed on Sep. 16, 2013.

(51) Int. Cl.
| G09B 9/00 | (2006.01) |
| G09B 19/00 | (2006.01) |
| A62C 99/00 | (2010.01) |

(52) U.S. Cl.
CPC ............ *G09B 9/00* (2013.01); *A62C 99/0081* (2013.01); *G09B 19/00* (2013.01)

(58) Field of Classification Search
CPC ...... A62C 99/0081; G09B 9/00; G09B 19/00; G09B 3/00
See application file for complete search history.

(56) References Cited

U.S. PATENT DOCUMENTS

| 4,861,270 A * | 8/1989 | Ernst ................. A62C 99/0081 434/226 |
| 4,986,364 A * | 1/1991 | Clark ....................... A62C 3/00 169/37 |
| 5,226,818 A | 7/1993 | Feiock et al. |
| 5,367,603 A | 11/1994 | Wenrich et al. |

(Continued)

FOREIGN PATENT DOCUMENTS

| EP | 1905486 | 4/2008 |
| WO | 2007/117795 | 10/2007 |
| WO | 2013/072759 | 5/2013 |

OTHER PUBLICATIONS

PCT, International Search Report and Written Opinion, PCT/US2014/055847, dated Dec. 22, 2014.

(Continued)

*Primary Examiner* — Timothy A Musselman
(74) *Attorney, Agent, or Firm* — Thompson Hine LLP

(57) ABSTRACT

A firefighting training system including a display device configured to display an actual or simulated fire and a sensor configured to detect an actual, simulated or virtual extinguishant that is directed at the display device. The system further includes a smoke or steam generation system configured to provide an output and a controller operatively coupled to the display device, the sensor and the generation system. The controller is configured to control the display of the actual or simulated fire and the output based at least in part upon an output of the sensor.

32 Claims, 3 Drawing Sheets

(56) References Cited

U.S. PATENT DOCUMENTS

| | | | | |
|---|---|---|---|---|
| 6,129,552 A | * | 10/2000 | Deshoux | A62C 99/0081 434/226 |
| 6,179,620 B1 | * | 1/2001 | Schmid | G09B 25/04 434/226 |
| 6,900,795 B1 | | 5/2005 | Knight, III et al. | |
| 7,157,668 B2 | * | 1/2007 | Bartelick | A23B 4/044 126/20 |
| 7,748,983 B2 | | 7/2010 | Blackburn et al. | |
| 8,096,810 B2 | | 1/2012 | Blackburn et al. | |
| 2002/0197591 A1 | | 12/2002 | Ebersole et al. | |
| 2003/0121672 A1 | | 7/2003 | Spaniol et al. | |
| 2005/0233289 A1 | * | 10/2005 | Hoglund | G09B 19/00 434/226 |
| 2008/0245888 A1 | * | 10/2008 | Zhu | B05B 17/08 239/20 |
| 2009/0197229 A1 | | 8/2009 | Blackburn | |
| 2010/0304345 A1 | | 12/2010 | Blackburn et al. | |
| 2014/0007778 A1 | * | 1/2014 | Marks | A23B 4/052 99/339 |
| 2014/0326806 A1 | * | 11/2014 | Grantham | A62C 31/24 239/525 |

OTHER PUBLICATIONS

EP, Supplementary Partial European Search Report, Patent Application No. 14844520.8, 12 pages (dated May 10, 2017).

EP, Supplementary Search Report, European Application No. 14844520.8 (11 pages) (dated Aug. 10, 2017).

EP, First Examination Report, European Patent Application No. 14844520.8 (9 pages) (dated Sep. 4, 2019).

* cited by examiner

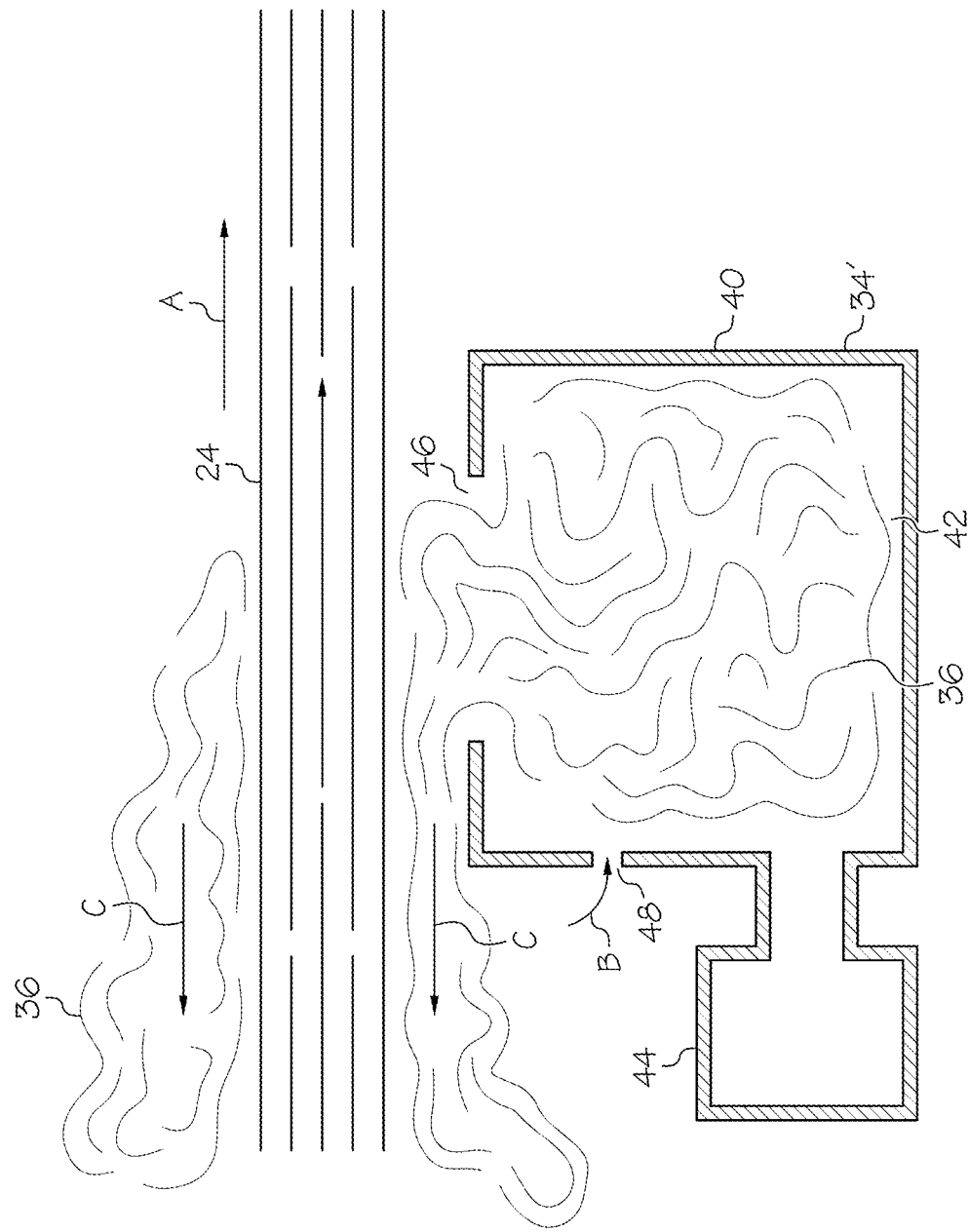

FIRE FIGHTING TRAINING SYSTEM WITH STEAM/SMOKE GENERATION

This application claims priority to U.S. Provisional Patent Application Ser. No. 61/878,355, filed on Sep. 16, 2013 and entitled FIRE FIGHTER TRAINING SYSTEM WITH SIMULATED STEAM GENERATION, the entire contents of which are hereby incorporated by reference.

This application is directed to a system and method for teaching users firefighting skills and techniques.

BACKGROUND

Fire fighter trainers and simulators are used to train fire fighters and other individuals, including in some cases members of the general public and those without specialized training, in proper firefighting techniques. Such trainers and simulators may provide a realistic but simulated firefighting environment by utilizing simulated or actual flames that can react to actual or simulated extinguishants. It may also be desired to provide steam/smoke generation as part of the training to provide a more realistic experience.

SUMMARY

The present invention, in one embodiment, is a firefighting training system that provides realistic but simulated firefighting training using simulated or actual flames along with steam or smoke generation. More particularly, in one embodiment the invention is a firefighting training system including a display device configured to display an actual or simulated fire and a sensor configured to detect an actual, simulated or virtual extinguishant that is directed at the display device. The system further includes a smoke or steam generation system configured to provide an output and a controller operatively coupled to the display device, the sensor and the generation system. The controller is configured to control the display of the actual or simulated fire and the output based at least in part upon an output of the sensor.

In another embodiment, the invention is a firefighting training system including a steam or smoke generation system including a housing defining a reservoir configured to receive steam or smoke therein. The housing includes an opening therethrough that is positioned and configured such that an extinguishant directed over the opening causes steam or smoke to be pulled out of the reservoir via the opening.

BRIEF DESCRIPTION OF THE DRAWINGS

FIG. 3 is a cross section taken along line 2-2 of FIG. 2.

DETAILED DESCRIPTION

Figure 1:
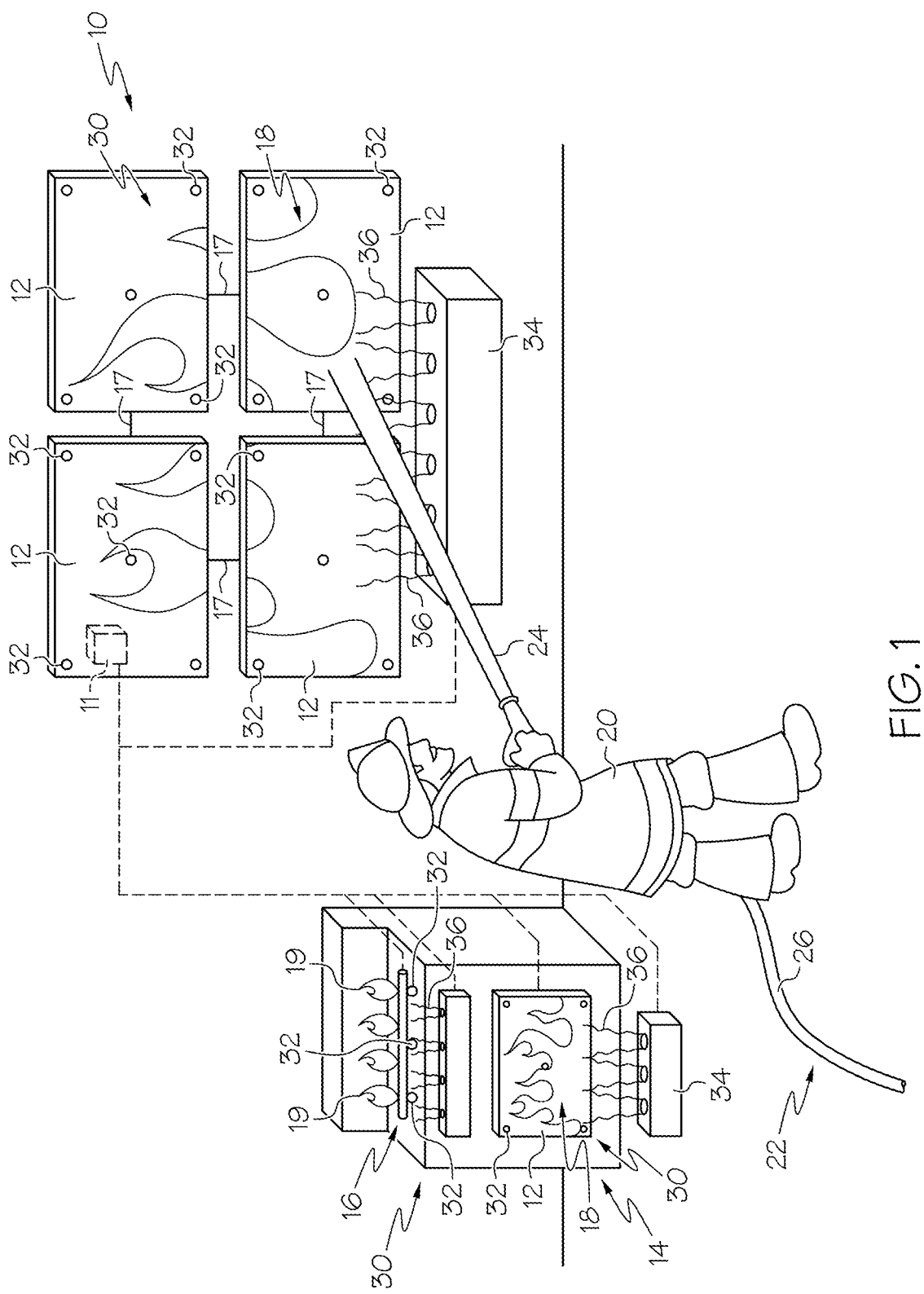
FIG. 1 is a schematic view of one embodiment of the fire fighter training device of the present invention.

As shown in FIG. 1, in one embodiment a training system, generally designated 10, includes a plurality of display, processing, sensing and/or control devices 12 (each termed a "display device" 12 herein) operatively coupled to each other, although only a single display device 12 may be used. In one case each display device 12 takes the form of a LED or OLED display or panel that is analogous to, or generally the same as, a LED television screen, although other technologies for the display devices 12 can be utilized, such as CRT, digital light processing, plasma, etc., so long as the display devices 12 can be made sufficiently fluid-tight (in appropriate circumstances) and are able to resist forces applied during training exercises. The display devices 12 can include a light source, display screen, and a controller 11 (such as a processor, microcomputer or the like) integrated into a single unit (e.g. positioned within an external casing, with the light source being behind the display screen, one of which is shown in FIG. 1), with these components being positioned within or coupled to a single housing such that each display device 12 is in one case relatively compact and manually carryable.

The display devices 12 can be arranged in an array, and are arranged in a 2×2 array in the illustrated embodiment. However, the display devices 12 can take other forms and be arranged in various other manners, as desired. In addition, the system 10 may utilize only a single display device 12 in some cases. Moreover, while FIG. 1 illustrates the display devices 12 mounted to a wall, the display devices 12 could instead be portable and/or stand-alone devices.

The system 10 may also include a prop or training device 14. The prop 14 can take any of a wide variety of shapes or forms, and can take on the appearance of nearly an item expected to be found in a house, office building, warehouse, factory, or other environments in which firefighting is carried out. In the illustrated embodiment the prop 14 take the form of a stove. The prop 14 may include or be coupled to a display device 12 which can be the same as or analogous to the display devices 12 described above, and which can include its own controller 11 and/or is operatively coupled to the controllers 11 of the other display devices 12. The system 10 or prop 14 can also include flame generator 16 that includes or is connected to a fuel source (such as natural gas, in one case) that is combustible to display a real flame 19 for training purposes. In the illustrated embodiment the flame generator 16 is carried on the prop 14, but the flame generator 16 can be positioned as a stand-alone device, or positioned at other locations in the training space.

The controller(s) 11 provide an output that can cause each display device 12 to display an image 18 to which a user/trainee 20, such as a fire fighter, is trained or encouraged to respond. For example, each display device 12 can be configured to display an image of fire 18 (which can include displayed smoke and/or flame) or other hazardous conditions. In one case, as shown in FIG. 1, the display devices 12 are networked together via cables 17 or the like such that each display device 12 displays part of a composite image 18 that is larger, in one case, than any one of the display devices 12. The flame generator 16 is also operatively coupled to its own controller 11 and/or a controller 11 associated with the display devices 12 to control, for example, the number or spread of flames 19, height or size of the flames 19, etc. by controlling the supply of fuel or other variables.

The trainee 20 may have access to an extinguishant system 22 which can be used to spray/project an actual and/or simulated extinguishant 24 which can be tangible or intangible. For example, in one case the extinguishant system 22 includes a hose 26 which sprays extinguishant 24 in the form of water that can be directed at the display devices 12 and/or props 14 and/or actual flames 19. In one particular embodiment, the extinguishant system 22 sprays liquid water at pressures the same as or comparable to that provided by fire hydrants, pump trucks or the like (at least about 50 psi in one case, or at least about 100 psi in another case, or at least about 125 psi in yet another case) using handlines to provide a realistic training experience. However, the hose 26/extinguishant system 22 can also spray various other substances including solids (such as chemical powder), liquids (such water, foam, or combinations thereof) or gases (such as inert gases including $CO_2$) of various forms, pressures and the like.

As noted above, in some cases the extinguishant system 22 may emit a material that is not necessarily an actual fire extinguishant (or at least not a widely used fire extinguishant, for example, polystyrene foam, rubber or synthetic rubber pellets, sawdust, etc.), but may be easier to use in the training system 10 due to ease of storing, processing and/or clean up, in the form of a simulated extinguishant. The extinguishant system 22 may also emit a directed signal that is not manually detectable by the user 20 (i.e. may not have any noticeable mass), which can be visible or not visible by the user 20, such as electromagnetic waves (including directed light waves, infrared waves, lasers, etc.), sonic waves or signals or the like, as a virtual extinguishant. In all cases, however, for the purposes of this document such items emitted by the extinguishant system 22 as described above and below (including actual, simulated and virtual extinguishants, both tangible and intangible) are included in the term "extinguishants."

The system 10 can include a sensor system 30 to sense the extinguishant 24 directed/sprayed by the trainee 20. The illustrated sensor system 30 includes utilizes a plurality of sensors 32 positioned on the display device 12 or on the prop 14, although the sensors 32 can be positioned adjacent to those components, or at other locations, to detect the applied extinguishant 24 or other activities of the trainee. In one case the sensors 32 take the form of temperature sensors, such as a thermistors, that can react to differing temperatures provided by conduction and/or convection of the extinguishant 24. Thus in one case the extinguishant 24 may impart cooling to the sensor 32, thereby changing the sensor's electrical resistance, producing a voltage or change in voltage across the sensor 32, and/or producing a current or change in current through the sensor 32. In this case the extinguishant 24 would typically be a fluid or a solid.

As further examples, the sensor 32 may include a bimetallic strip that exhibits a change in internal stresses when heated or cooled, a thermocouple or thermopile, a vibration sensor, a microphone, a capacitive sensor, a resistive sensor, a reflective sensor, etc. However, the sensor(s) 32 can take any of a wide variety of other forms, including nearly any device having physical or detectable properties that change when an external stimulus, such as a simulated, actual or virtual extinguishant, is applied to, directed at or received by the sensor 32.

The extinguishant sensors 32 can be either active or passive. The extinguishant sensors 32 can also take the form of or include a device which detects electromagnetic signals, including at or near infrared wavelengths, such as a thermal camera or an infrared thermometer, or take the form of motion detectors. The extinguishant sensor 32 can also take the form of mechanical components such as pinwheels.

The output of each sensor 32 can be provided to the controller(s) 11 thereby sense the presence of the extinguishant 24, the amount of extinguishant 24 being applied to the sensor 32, the duration of applied extinguishant 24, the manner in which the extinguishant 24 is being applied, etc. Proper firefighting technique (i.e. where extinguishant 24 is aimed at the proper locations for the proper duration and in the proper methods or techniques) can cause the controller(s) 11 to reduce the size of the displayed 18 and/or actual 19 fire/flame, or cause the fire/flame 18/19 to grow at a reduced rate. Conversely, relatively poor firefighting technique (i.e. where extinguishant 24 is not aimed at the proper locations, and/or for improper durations, and/or using improper methods or techniques) can cause the controller(s) 11 to increase the size of the displayed 18 and/or actual 19 fire/flame, or cause the fire/flame 18/19 to grow at an increased rate.

The controller(s) 11 can be configured to present a predetermined flame pattern to the trainee, or provide natural flame growth using an algorithm. In one case, for example, a user may be able to identify a particular location on the display device 12, such as via an infrared remote control, and indicate that a fire should be initiated at the indicated location to trigger the fire which can grow naturally based upon fire growth algorithms. Alternately, or in addition, the controller(s) 11 may be able to be controlled by a human operator/trainer to adjust flame conditions on-demand. The controller(s) 11 can also be coupled to simulated sources of the heat, flame, gases, combustion sounds and/or combustion smells, which can also be actuated and controlled in accordance with the displayed 18 and/or actual 19 fire, and adjusted based upon the firefighting technique of the trainee 20.

The characteristics of the fire 18/19 displayed by the display devices 30 and the flame generator 16 can be determined by the various factors of the simulated fire as inputted to/stored in the controller(s) 11, including the type of fuel, how much fuel is burning, percentage of fuel left as a viable fuel source, ambient air temperature, fire temperature, ambient smoke level, and the amount, location and duration of extinguishant applied. Thus, rather than generating a flame 18/19 based upon stored data related to a previously-recorded fire, the system 10 may instead utilize an algorithm that utilizes various inputs that determine fire conditions, and process those inputs to result in an output of adjusted fire conditions in real time, which can also include smoke or steam output as described below. This system results in a less predictable and more realistic fire simulation, and better training for the trainee 20.

The system 10 can include one or more smoke and/or steam generators 34 that are operatively coupled to the controller(s) 11 and provide an output 36. The output 36 can be in the form of smoke (including traditional smoke as a combustion by-product), steam, visible gases, or visible liquid or solid particulates suspended in air or other gases. During a normal burning/combustion process, the system may generate output 36 in the form of, or mimicking, smoke/ambient smoke in a manner as calculated by the controllers(s) 11. In the absence of extinguishant 24 being applied, the smoke output 36 may change slowly over time, but may be relatively constant and change only as fire conditions change (i.e. as a fire naturally grows or burns out).

In contrast, when extinguishant 24 is applied, the generators 34 can be controlled provide an output in the form of, or mimicking, steam. The controller(s) 11/generators 34 respond to qualities of the simulated fire, and the manner in which the extinguishant 24 is applied to provide an output 36 that mimics steam in real world firefighting. The controller(s) 11 thereby provide an output to cause the generators to generate steam 36 in the desired quantities, at the desired density, in the desired amounts and at the desired times in real time to correspond to fire conditions and applied extinguishant 24. The quality and quantity of the steam 36 can be determined by various factors as inputted to/stored in the controller(s) 11, including the type of fuel, how much fuel is burning, type of fire, fire size, percentage of fuel left as a viable fuel source, ambient air temperature, fire temperature, ambient smoke level, and the amount (cumulative and/or relatively instantaneous), location and/or duration of applied extinguishant 24.

The system 10 thereby provides computer controller steam generation which provides realistic responses. For example, when extinguishant 24 is applied to simulated fire known to be a simulated fully involved class A fire, the controller(s) 11 can cause the associated generators 34 to provide an output 36 in the form of relatively large quantities of dense steam, mimicking real world conditions. On the other hand, if the simulated/displayed fire 18/19 represents a class B fire, and the extinguishant 24 is an actual or simulated foam, the system 10 will call for a relatively small amount of output 36 in the form of mimicked steam 36. In this manner the system 10 can utilize a continuous stream of data, which relates to the state of the fire 18/19 and applied extinguishant 24, to constantly vary the generation of steam/smoke output 36 to match the status of the fire.

In some cases, the generators 34 may be controlled to provide an output 36 at a predetermined density and/or temperature for optimal dispersion in the ambient environment. The density of the steam refers to its thickness, and is dependent on how the output 36 is mixed in the atomization process.

In one case, as outlined above, the system 10 can cause the generator 34 to provide an output 36 to mimic ambient smoke, which is the level of smoke when no extinguishant 24 is being applied. In contrast, when an extinguishant 24 is applied, output 36 of the generator 34 can increase significantly, creating a steam effect, due to simulated vaporization of the extinguishant 24 and/or smouldering of the fire. In one case ambient smoke density is determined by the following principle:

$$\text{Ambient Smoke/Steam Density} = \text{Material Factor}(\text{Percent or Amount Burning} + \text{Fire Temperature})$$

In this case the Material Factor is a coefficient that depends upon type of fire (e.g. class A, B, C in one case) and/or the nature of the fuel (e.g. a couch vs. a wall vs. an electrical appliance, etc.). "Percent or Amount Burning" refers to the percentage of the fuel that is currently burning, or an amount of the fuel that is burning, or some combination thereof. Various other equations which take these, and/or other, factors into consideration can be utilized.

In one case the steam density during extinguishant application is determined by the following principle:

$$\text{Smoke/Steam Density During Extinguishant Application} = (\text{Extinguishant Type/Ambient Temperature}) \times (\text{Material Water Retention Factor} + \text{Fire Size})$$

In this case Extinguishant Type is a factor that relates to the steam generation capacity of the extinguishant, and the smoke/steam density value may be a relatively linear variable such that more smoke/steam is created as the value for the Extinguishant Type increases. For example, for water may have a higher Extinguisher Type number compared to, for example, dry chemicals. The Material Water Retention Factor relates to the ability of the fuel to store/retain water. In general, materials with a higher Material Water Retention Factor, such as wood, can correlate to a higher smoke/steam density compared to materials with a lower Material Water Retention Factor, such as coal. The Fire Size can relate to the volume and/or surface area of the fire, defined by in one case its flame, coals and/or fuel. Various other equations which take these, and/or other, factors into consideration can be utilized.

The output of the equations above can be utilized to control an output of a generator device 34. In example, the generator device 34 may burn or vaporize a liquid via its heater core to produce its output, and the output of the equations above can determine how much fluid is fed to the heater core, which determines output density.

A Duty Cycle value can be a second input provided to the generator device 34 to control how much the generator device 34 is run over a given time period (e.g. in one case a number between 1-100, with a value of 100 representing a case wherein the device 34 is run 100% of the time for a given time cycle). In one case the Duty Cycle can be determined by the following principle:

$$\text{Duty Cycle} = \int f(\text{Fire Temperature/Extinguishant Volume})$$

where the integral value can be taken over the entire time of the simulation and/or lifetime of the fire. As can be seen, lower temperatures of the fire can reduce the duty cycle, and ultimately output 36. Conversely high extinguishant volume can reduce the Duty Cycle and output 36. Thus, the system 10 is able to determine that a relatively small amount of extinguishant 24 applied to a fire of a fixed size can result in a relatively high level of output 36 in the form of simulated steam. In contrast, a relatively large amount of extinguishant 24 can be known/projected to quickly smother the fire, resulting in a relatively low amount of simulated steam 36. Various other equations which take these, and/or other, factors into consideration can be utilized to control the Duty Cycle.

The generators 34 can take any of a wide variety of forms and shapes, but in one embodiment are a Smoke Generator 4000 or Smoke Generator 6000 sold by Bullex, a division of Lion Apparel, Inc., located in Albany N.Y. The generators 34 can create smoke/steam output 36 by any of a variety of well-known manners, including vaporizing water and glycol-based and/or glycerin-based fluids, or through the atomization of mineral oil, although the generators 34 are not limited to such embodiments. The generators 34 may utilized precision controlled electro thermal atomization, which can provide precise, metered, and quick-response smoke outputs.

Each component in the system 10 (i.e. the array of displays 30, or an individual display 30, or a prop 14, or other components) can have its own associated flame display 18/19, sensor system 30, controller 11 and/or generator 34. In this manner, the training area can be divided into multiple zones. Data for the fire 18/19 for each sensor system 30 and/or flame display 18/19 in a zone can, if desired, be combined to create composite values that control the output for each generator 34 for each zone, which can control the smoke/steam generation. Alternately, if desired, each generator 34 in each zone can be individually controlled.

Figure 2:
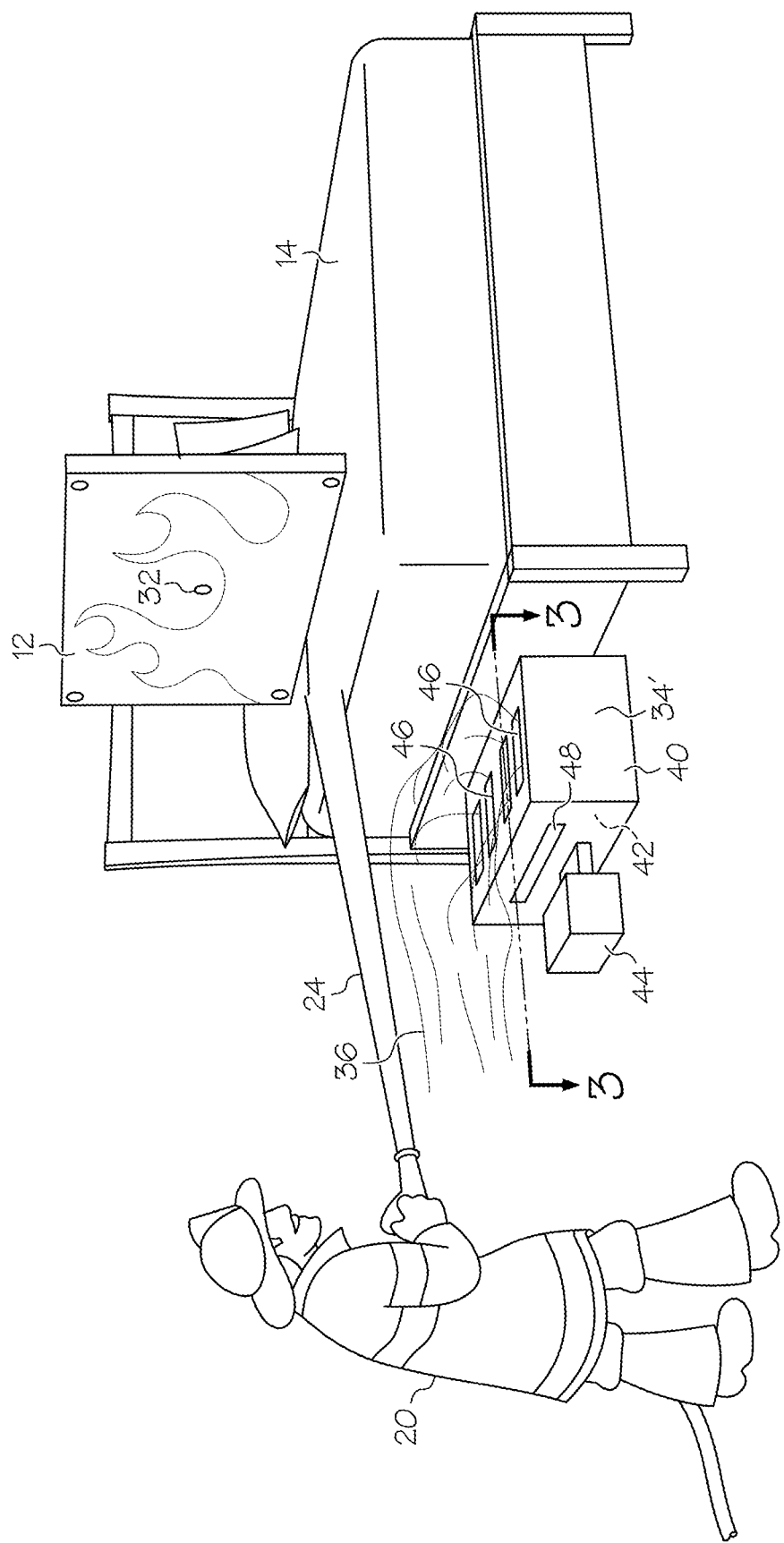
FIG. 2 is a schematic view of another embodiment of the firefighting training device of the present invention.

Each generator 34 can include various ports or outputs to directly provide steam 36 in the desired amounts. In an alternative embodiment, as shown in FIGS. 2 and 3, the generator 34' can include a housing 40 defining a reservoir 42, which takes the form of a generally closed volume into which output 36 is provided from a steam/smoke source 44. The housing 40 may include one or more outlet openings 46 and one or more inlet openings 48 formed therethrough. In one embodiment, each outlet opening 46 is positioned at or adjacent to a location where it may be desired for a trainee/user 20 to direct extinguishant 24. For example, the housing 40 can be defined by the space under a prop bed, with fire panels on a top surface, or upper-most surface, that define the outlet openings 46, wherein the bed is fully or partially skirted to seal the reservoir 42. The embodiment shown in FIGS. 2 and 3, however, illustrate the housing 40 as a separate structure positioned adjacent to a bed prop 14.

The reservoir 42 may remain generally filled with smoke or steam output 36 from the steam/smoke source 44. When the trainee 20 directs an actual or simulated extinguishant 24 (that is physically detectable or tangible—e.g. has recognizable mass) over the reservoir 42, the extinguishant 24 may pass over the outlet openings 46 in the direction of arrow A of FIG. 3. The flow of extinguishant 24 over the outlet openings 46 creates a venturi effect, pulling smoke/steam 36 out of the outlet openings 46 and into the training space. Ambient air may be pulled into the reservoir 42 via the inlet openings 48, as shown by arrow B, to provide pressure balance in the reservoir 42.

The inlet opening(s) 48 can be spaced apart from the outlet openings 46, and are positioned on the front side of the housing 40 in the illustrated embodiment. Once the smoke/steam 36 exits the reservoir 42, the smoke/steam 36 is drawn further away from the reservoir 42 and towards the source of the extinguishant 24. This effect is due to the replacement of air that has been displaced by the extinguishant 24 as the extinguishant 24 rapidly moves through the air, causing available replacement air to be drawn towards the extinguishant operator 20, as shown by arrow C. This effect is similar to smoke behavior during hydraulic venting of a smoke filled building, and produces a realistic smoke and steam layering effect.

In this embodiment, then, output 26 is introduced into the training space as simulated steam or smoke by a venturi effect, and does not require any sensors, controls, fans or air movement devices, etc. but instead is a passive system relying upon natural forces, while still providing a realistic steam effect. The generator 34' may thus lack any fans or air movement devices. The output 36 in the reservoir 42 may combined with air prior to leaving the reservoir 42, which can provide a more realistic looking smoke/steam 36 as compared to output 36 directly ejected from the generator 34. In addition, the hydrodynamic instability providing by mixing and the venturi effect provides a more realistic effect. The shape, size and locations of the openings 46, 48 and reservoir 42 can be designed to control the release of the steam/air mixture to tailor the generator 34' to the desired conditions. The generator 34' can be used in conjunction with a display device 12 as shown in FIG. 2, or a prop 14 in the form of a bed as shown in FIG. 2, or a flame generator 16, etc.

The generator 34' also realistically mimics thermal layering effects in firefighting settings. In particular, under actual burning conditions, a relatively stable thermal layering situation is typically set up in a room. When an extinguishant 24, such as water, impinges upon the fire, the water is turned into steam and expands rapidly and disrupts the thermal layering, which can cause unpredictable dispersal of heat, smoke and steam, and can cause dispersal of heat, smoke and/or steam at the firefighter. The generator 34' thus realistically mimics the disruption of thermal layering faced by firefighters in real firefighting conditions.

The current system allows various inputs relating to fire conditions and applied extinguishants to be received and processed to provide real-time, responsive and realistic steam generation. The system also contemplates a passive steam generation system in some cases to produce an extremely realistic smoke and steam effect. The system thereby provides elegant, scalable solutions for generating smoke and steam effects.

Having described the invention in detail and by reference to the various embodiments, it should be understood that modifications and variations thereof are possible without departing from the scope of the claims of the present application.

What is claimed is:
1. A firefighting training system including:
a display device configured to display an actual fire, or configured to display a simulated fire on a water-tight display configured to withstand a liquid stream at a pressure of at least about 50 psi directed thereat while continuing to operate and display said simulated fire;
a sensor configured to detect an actual, simulated or virtual extinguishant that is directed at said display device;
a smoke or steam generation system configured to provide an output; and
a controller operatively coupled to said display device, said sensor and said generation system, wherein said controller is configured to control the display of said actual or simulated fire and said output of said generation system based at least in part upon an output of said sensor, wherein said system is configured to at least initially increase said output of said generation system when said extinguishant is initially sensed by said sensor.

2. The system of claim 1 wherein said sensor is positioned on or adjacent to said display device.

3. The system of claim 1 wherein said system includes a plurality of sensors configured to detect an actual, simulated or virtual extinguishant that is directed at said display device.

4. The system of claim 1 wherein said controller is configured to monitor an output of said sensor such that proper use of said extinguishant, as determined by said controller, causes said controller to reduce a size of said fire displayed by said display device, or reduce a rate at which said size of said fire displayed by said display device grows, and wherein said controller is configured such that said proper use of said extinguishant causes said controller to at least initially increase said output of said generation system.

5. The system of claim 1 wherein said output of said generation system is at least one of a smoke, steam, or simulated smoke or simulated steam output, and wherein a magnitude of said output of said generation system is determined at least in part based upon qualities of said actual or simulated fire, an amount of extinguishant that is directed at said display device, and a manner in which said extinguishant is directed at said display device.

6. The system of claim 1 wherein the system is configured such that said output of said generation system is at an ambient level of smoke or steam when an actual or simulated fire is displayed but no extinguishant is applied, and wherein said system is configured to at least initially increase said output of said generation system when said extinguishant is initially sensed by said sensor.

7. The system of claim 6 wherein said ambient level of smoke or steam is determined at least in part based upon the type of said actual or simulated fire or the nature of a fuel being burned, a percent or amount of the fuel burning and a temperature of said fire.

8. The system of claim 6 wherein said ambient level of smoke or steam is determined at least in part by ambient smoke density value obtained by the following formula:

Ambient Smoke/Steam Density Value=Material Factor×(Percent or Amount Burning+Fire Temperature)

wherein the Material Factor is value indicative of the type of said actual or simulated fire or the nature of a fuel being burned, wherein Percent or Amount Burning is a value indicative of a percent or amount of the fuel currently burning, and wherein Fire Temperature is a value indicative of a temperature of said fire.

9. The system of claim 6 wherein said output of said generation system when extinguishant is sensed by said sensor is based at least in part upon a steam generation capacity of said extinguishant, an ambient temperature, an ability of a fuel of said fire to store/retain water, and a size of said fire.

10. The system of claim 6 wherein said output of said generation system when extinguishant is sensed by said sensor is determined at least in part by steam density value obtained by the following formula:

Smoke/Steam Density During Extinguishant Application=(Extinguishant Type/Ambient Temperature)×(Material Water Retention Factor+Fire Size)

wherein the Extinguishant Type is a value indicative of a steam generation capacity of said extinguishant, Ambient Temperature is a value indicative of an ambient temperature, Material Water Retention Factor is a value indicative of an ability of a fuel of said fire to store or retain water, and Fire Size is a value indicative of a size of said fire.

11. The system of claim 1 wherein said output of said generation system is determined at least in part based upon a temperature of said fire and a volume of said extinguishant applied, to determine a duty control value provided to said generation system.

12. The system of claim 1 wherein said output of said generation system is determined at least part by the following formula:

Output~$f$(Fire Temperature/Extinguishant Volume)

wherein Fire Extinguishant is a value indicative of a temperature of said fire and Extinguishant Volume is a value indicative of a volume of said extinguishant applied.

13. The system of claim 1 wherein said display device is configured to display an actual fire.

14. A method for teaching firefighting skills including:
displaying an actual fire, or displaying a simulated fire on a water tight display configured to withstand a liquid stream at a pressure of at least about 50 psi directed thereat while continuing to operate and display said simulated fire;
detecting an actual, simulated or virtual extinguishant that is directed at said actual or simulated fire;
providing a smoke or steam output;
controlling said display of said actual or simulated fire and said output based at least in part upon said detecting step; and
upon initial detection of said actual, simulated or virtual extinguishant directed at said actual or simulated fire, at least temporarily increasing said smoke or steam output.

15. A firefighting training system including:
a steam or smoke generation system including:
a housing defining a reservoir configured to receive steam or smoke therein, said housing including an opening in fluid communication with said reservoir, wherein the opening is positioned and configured such that an extinguishant directed over said opening causes said steam or smoke to be pulled out of said reservoir via said opening, wherein said opening is configured to be at an elevation lower than a height of a user using said training system; and
a steam or smoke source spaced away from but in fluid communication with the reservoir to generate the steam or smoke and provide the generated steam or smoke to the reservoir.

16. The system of claim 15 wherein said opening is positioned along an upper surface of said housing, and wherein the housing includes an air inlet opening spaced away from said opening and spaced away from said upper surface and configured to allow ambient air to enter said reservoir.

17. The system of claim 15 wherein said reservoir includes a plurality of openings therethrough that are positioned and configured such that said extinguishant directed over said openings causes steam or smoke to be pulled out of said reservoir via said openings.

18. The system of claim 15 wherein said housing is configured such that said extinguishant directed over said opening causes steam or smoke to be pulled out of said reservoir via said opening toward a source of said extinguishant.

19. The system of claim 15 further comprising a display device configured to display an actual or simulated fire, wherein said steam or smoke generation system is positioned adjacent to said display device such that a user is cued to direct said extinguishant at said display device, causing said steam or smoke to be pulled out of said reservoir.

20. The system of claim 15 further comprising said extinguishant directed over said opening and causing steam or smoke to be pulled out of said reservoir via said opening.

21. The system of claim 15 further comprising a conduit fluidly connecting said housing and said steam or smoke source.

22. The system of claim 15 wherein the steam or smoke source is generally fluidly isolated from the reservoir.

23. The system of claim 15 wherein the steam or smoke source is configured to generate at least one of steam, simulated steam, smoke or simulated smoke.

24. The system of claim 15 wherein the steam or smoke source is configured to generate at least one of steam, simulated steam or simulated smoke.

25. The system of claim 15 wherein the steam or smoke generation system is configured to generate simulated smoke.

26. The system of claim 15 wherein said housing is positioned inside a closed training space into which said steam or smoke is introduced when pulled out of said reservoir, and wherein housing is configured such that said user is positionable therein.

27. The system of claim 15 wherein said opening is positioned such that said opening is located at an elevation lower than a height of a user using said training system when said housing and said user are both positioned on the same flat surface.

28. A method for firefighting training including:
accessing a steam or smoke generation system including a housing defining a reservoir with steam or smoke received therein, said housing including an opening in an upper surface of said housing; and
directing an extinguishant adjacent to said opening, thereby causing said steam or smoke to be pulled out of said reservoir via said opening.

29. The method of claim 28 wherein the steam or smoke generation system further includes a steam or smoke source spaced away from but in fluid communication with the reservoir to generate the steam or smoke and provide the generated steam or smoke to the reservoir.

30. The method of claim 28 wherein the steam or smoke generation system is configured to generate simulated smoke.

31. The method of claim 28 wherein said opening is positioned at an elevation lower than a height of a user who is directing said extinguishant.

32. The method of claim 28 wherein said housing is positioned inside a closed training space into which said steam or smoke is introduced when pulled out of said reservoir, and wherein a user who is directing said extinguishant is positioned in said housing.

* * * * *